United States Patent
Kubicek

[15] 3,658,435
[45] Apr. 25, 1972

[54] COMPRESSION HOLDER

[72] Inventor: Louis A. Kubicek, Ypsilanti, Mich.

[73] Assignee: Burr-Ban Tool Service Company, Detroit, Mich.

[22] Filed: Dec. 22, 1969

[21] Appl. No.: 887,059

[52] U.S. Cl. ........................... 408/239, 408/228, 408/714
[51] Int. Cl. ................................................... B23b 51/16
[58] Field of Search .................... 77/73.5; 408/228, 239, 714

[56] References Cited

UNITED STATES PATENTS 3,230,798  1/1966  Kubicek et al. ......................... 77/73.5

OTHER PUBLICATIONS

Publication: IBM Technical Disclosure Bulletin, Vol. 6, No. 8, January 1964, page 15, article entitled "Quick Action Countersink" by R. Deporto and J. Saxon Primary Examiner—Francis S. Husar
Attorney—Hauke, Gifford and Patalidis

[57] ABSTRACT

A tool holder having a cylindrical outer housing adapted to be inserted into a chuck of a rotary drive mechanism. A tool supporting rod is axially slidably mounted in a bore formed in the housing for rotation about its axis of elongation. A coil spring disposed within the bore between the inner end of the tool supporting rod and the closed end of the bore biases the rod toward an extended position. During the feed-in of the machine chuck in the deburring of holes, the coil spring can be compressed to permit the tool to be retracted when the deburring tool engages an unfinished hole resulting from drill breakage to thereby prevent the deburring tool from being forced into the unfinished hole and thereby broken.

6 Claims, 4 Drawing Figures

PATENTED APR 25 1972 3,658,435
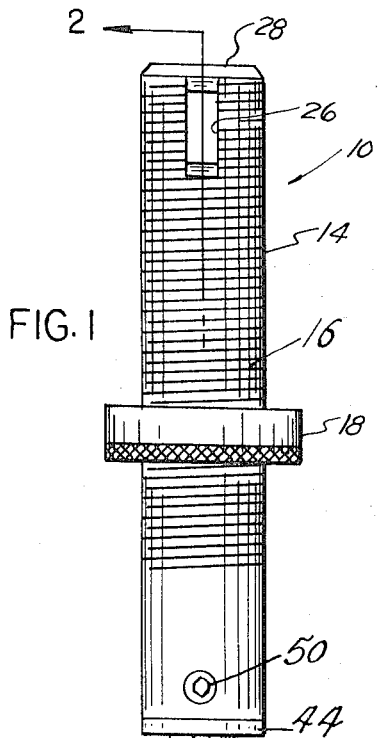
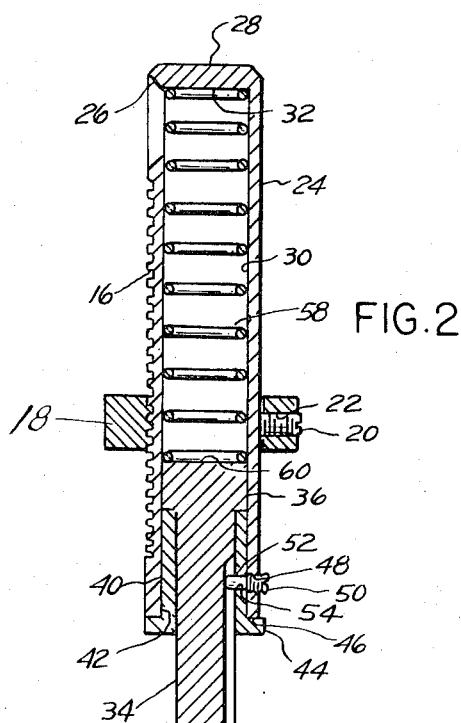
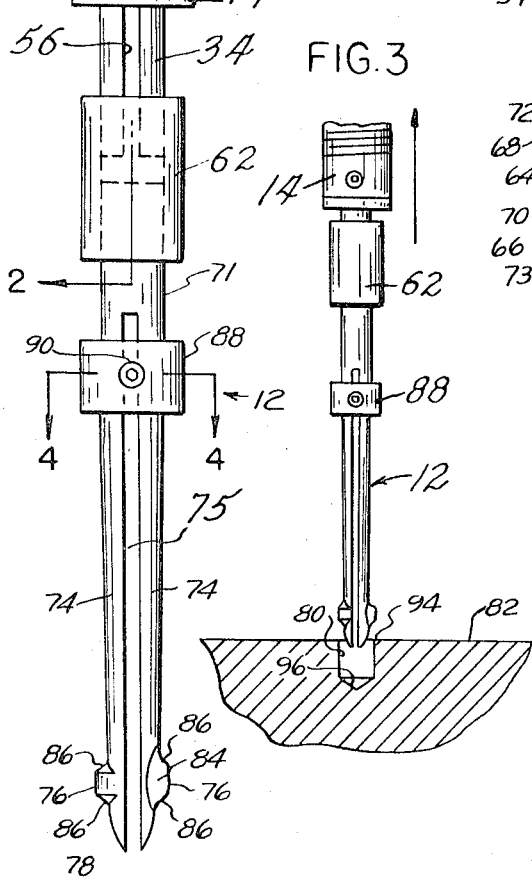
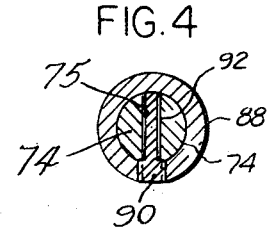
FIG. 1
FIG. 2
FIG. 3
FIG. 4
INVENTOR
LOUIS A. KUBICEK
BY Hauke, Gifford & Patalidis
ATTORNEYS

COMPRESSION HOLDER

BACKGROUND OF THE INVENTION

1. Field of the Invention

The invention relates to tool holders and more particularly to a tool holder having means permitting the tool carried thereby to be moved from a normal extended position to a retracted position to prevent tool breakage.

2. Description of the Prior Art operation.

In the drilling and deburring of holes in workpieces, oftentimes the hole is drilled and immediately thereafter the edges of the hole are deburred. Usually in these types of operations the workpiece is passed in front of several machine chucks having the necessary tools to perform the drilling and deburring operation. Frequently, the drilling and deburring operations are out of view of the machine operator and pass in front of the operator only after both operations have been completed. When a drill is accidentally broken during the drilling operation resulting in an unfinished hole, the workpiece automatically advances to the next station where the deburring operation takes place without the operator detecting that a drill has broken. As the deburring tool is advanced into the unfinished hole, the end of the deburring tool engages the inner surface of the unfinished hole and is broken thereby, necessitating the replacement of not only the broken drill but also the broken deburring tool.

SUMMARY OF THE INVENTION

The tool holder of the present invention solves the problems of the prior art devices by providing a resilient member between the machine chuck and the deburring tool which absorbs the feed-in of the chuck when the deburring tool engages an unfinished hole. The tool includes a cylindrical outer housing for insertion into the chuck of a rotary drive machine for rotation about its axis of elongation. The outer housing includes a cylindrical bore formed therein parallel to the axis of elongation of the housing and closed at one end. A tool supporting rod having an end portion axially slidably mounted within the bore of the outer housing has an elongated slot formed therein parallel to the axis of elongation of the rod. The outer housing includes a radially directed threaded aperture formed adjacent the bore opening for receiving a screw having a cylindrical projection formed on its inner end. The projection extends into the elongated slot of the rod, rotating the rod about its axis of elongation as the housing is rotated, but not inhibiting the axial movement of the rod. A coil spring disposed within the bore between the inner end of the rod and the closed end of the bore biases the rod toward the bore opening. A collet is secured to the outer end of the rod for securing a deburring tool thereto.

A deburring tool, preferably including a pair of parallel arms each having a radially extending cutting lobe formed thereon, is secured for rotation to the outer end of the rod by the collet. As the holder and deburring tool are rotated by the drive machine, the deburring tool is moved into the hole in the workpiece to be deburred. If the hole in the workpiece has not been completely formed due to the drill having been previously broken, the end of the deburring tool engages the inner end of the unfinished hole or the upper surface of the workpiece and further feed-in by the drive machine pushes the rod into the bore, compressing the spring therein and preventing the deburring tool form being broken by the feed-in of the drive machine. Thus, even if the hole in the workpiece has not been completely formed, the deburring tool is not broken by the feed-in of the drive machine.

DESCRIPTION OF THE DRAWINGS

The description refers to the accompanying drawings wherein like reference characters refer to like parts throughout the several views and in which:

FIG. 1 is a side elevational view of a preferred embodiment of the present invention;

FIG. 2 is a cross sectional view taken on line 2—2 of FIG. 1;

FIG. 3 is a side elevational view showing the deburring tool being pushed into an unfinished hole in the workpiece; and FIG. 4 is a cross sectional view taken on line 4—4 of FIG. 1 showing the adjustment mechanism.

DESCRIPTION OF THE PREFERRED EMBODIMENT

Referring to FIG. 1, a tool holder, generally indicated at 10, is adapted to carry a deburring tool, generally indicated at 12, such that the tool holder 10 and the deburring tool 12 are rotated about their axes of elongation by the chuck of a suitable rotary drive machine (not shown).

The tool holder 10, as shown in FIGS. 1 and 2, includes an outer cylindrical housing 14 which has threads 16 formed along its outer surface for receiving an adjustment collar 18 screwed thereon. The adjustment collar 18 is provided with a set screw 20 (FIG. 2) threaded into an aperture 22 formed therein for locking the collar on the housing 14 at the desired axial position. When the outer housing 14 is inserted into the chuck of a rotary drive machine, the collar 18 engages the front surface of the chuck to provide an adjustable stop to axially locate the housing 14 with respect to the chuck.

As can best be seen in FIG. 2a portion of the threads 16 are ground away to provide a flat surface 24 which receives a set screw (not shown) carried by the chuck of the drive machine to secure the outer housing 14 in the chuck. A Woodruff key slot 26 is formed in the housing 14 adjacent the rear end 28. The slot 26 receives a Woodruff key (not shown) carried by the machine chuck for rotatably driving the outer housing 14 about its axis of elongation.

The outer housing 14 is formed with a cylindrical bore 30 extending parallel to the axis of elongation of the outer housing and having a closed inner end formed by upper surface 32. A tool supporting rod 34 having an end portion slidably mounted within the bore 30 is formed with an enlarged inner end 36. The inner end 36 forms a bearing surface engaging the inner surface forming the bore 30 to facilitate axial sliding movement of the rod 34 within the bore 30. A cylindrical collet 40 slidably mounted around the rod 34 and formed with a slightly smaller outer diameter than the bore 30 is positioned within the bore 30 adjacent the bore opening 42 for providing a second bearing surface for the rod 34. The collet 40 includes an annular flange 44 which extends radially outwardly from the outer end of the collet so as to engage the front surface 46 of the housing 14, aiding in the positioning of the collet within the bore 30.

Still referring to FIG. 2 the housing 14 is formed with a radially directed threaded aperture 48 adjacent the bore opening 42 for receiving a screw 50 formed with a cylindrical projection 52 on its inner end. The projection 52 extends through an aperture 54 formed in the collet 40, securing the collet 40 against axial or rotary movement relative to the housing 14. The rod 34 is formed with an elongated slot 56 substantially parallel to the axis of elongation of the rod 34 for receiving the end of the projection 52. Thus, as the housing 14 is rotated by the machine chuck, the projection 52 engages the surface forming the slot 56 to rotate the rod about its axis of elongation but does not prevent the rod 34 from sliding axially within the bore 30.

A coil spring 58 disposed within the bore 30 is compressed between the inner surface 60 of the inner end 36 and the surface 32, urging the rod 34 toward the bore opening 42.

Still referring to FIG. 2, a collet 62 is positioned around the outer end of the rod 34 and includes a pair of radially directed threaded apertures 64 and 66 formed therein for receiving set screws 68 and 70, respectively. The inner end of the set screw 68 engages a flat surface 72 formed on the outer end of the rod 34 for securing the collet thereto. The upper end of the shank 71 of the deburring tool 12 is inserted into the other end of the collet 62 and secured therein by means of the set screw 70, engaging a flat surface 73 on the shank 71, thus, securing the tool 12 to the rod 34.

The deburring tool 12, as illustrated in FIGS. 1, 3 and 4, and as shown and described in more detail in my U.S. Pat. No. 3,230,798, issued Jan. 25, 1966, is preferably formed with a longitudinally extending tension slot 75 forming a pair of substantially parallel and symmetrical support columns 74. Substantially arcuate cutting ridges or lobes 76 are preferably formed on the periphery of each of the support columns 74. The cutting ridges 76 are spaced axially somewhat from the free ends of the support columns 74 to form a pilot portion 78 to aid in the insertion of the deburring tool 12 into the hole 80 (FIG. 3) of the workpiece 82 to be deburred. The cutting ridges 76 are provided with substantially radially extending flat surface portions 84. These are disposed in substantially parallel planes on opposite sides of the deburring tool 12 and provide sharp cutting edges 86 at each side of ridges 76.

A collar 88 is slidably mounted around the support columns 74 and is retained in position by means of a set screw 90 integrally carrying a pin 92 disposed to extend inwardly into the tension slot 75, as is shown in FIG. 4. When the set screw 90 is tightened against the outer surface of the support columns 74, the pin 92 provides a fulcrum for the support columns 74 at the point of adjustment so that the flexibility of the support columns will depend upon the longitudinal position of the collar 88.

In operation, the shank 71 of the deburring tool 12 is secured in the collet 62 by set screw 70. The adjustment collar 18 is then positioned on the housing 14, setting the distance the housing 14 and the tool 12 extend from the machine chuck. A Woodruff key is then inserted into the slot 26 and the rear portion of the housing 14 is inserted into the machine chuck with the face of the chuck flush with the collar 18. The housing 14 is secured therein by turning a set screw against the surface 24. As positioned, the holder 10 and the tool 12 are rotated about their axes of elongation by the chuck of the rotary drive machine.

Referring to FIG. 3, as the deburring tool 12 is advanced toward the hole 80 to be deburred, the pilot portion 78 enters the hole 80. If the hole 80 has been properly formed to a sufficient depth, the bottom cutting edges 86 of the ridges 76 engage the upper edge 94 with the rotary motion of the tool 12 deburring the edge 94.

If the hole 80 has been properly formed completely through the workpiece 82, the tool 12 continues to advance and the arms 74 are pushed together by the engagement of the ridges 76 and the hole 80, allowing the ridges 76 and a portion of the arms 74 to pass through the hole 80 to deburr the bottom edge of the hole. When the ridges 76 have cleared the hole 80, the arms 74 spring back to their original position, ready to deburr the back edge of the hole 80 on the back stroke of the drive machine.

If the hole 80 has not been properly formed to a sufficient depth due to breakage of the drill or the like, as the deburring tool 12 is advanced toward the hole to be deburred the pilot portion 78 enters the hole. As the tool 12 continues to be fed into the hole 80 by the drive machine, the pilot portion 78 engages the inner end 96 of the unfinished hole 80 or engages the upper surface of the workpiece if no hole at all has been formed, stopping the advancement of the tool 12. The continued feed-in of the drive machine pushes the rod 34 into the bore 30, compressing the spring 58. The rod 34 slides upon the bearing surface formed between the inner end 36 and the bore 30 and the bearing surface formed between the rod 34 and the collet 40. As the rod 34 is pushed into the bore 30, the inner end of the projection 52 slides along in the slot 56 formed in the rod 34, thus, permitting the rod to be retracted into the bore 30 even while the tool continues to rotate. As the housing 14 is rotated by the machine chuck, the screw 50 is turned, rotating the rod 34 about its axis by the engagement of the projection 52 and the slot 56. As the rod 34 is pushed into the bore 30, the coil spring 58 is compressed between the inner surface 60 of the rod 34 and the surface 32 of the housing 14. The compression of the spring 58 during the feed-in of the machine chuck allows the deburring tool 12 to remain with its pilot portion 78 in contact with the inner end 96 without pushing the deburring tool 12 further into the unfinished hole 80. Thus, the tool holder 10 prevents the deburring tool 12 from being broken during the feed-in of the drive machine when the hole has not been properly formed in the workpiece.

It is to be noted that the strength of the spring 58 may be varied in accordance with the strength of the support columns 74, such that, when the support columns 74 are weak a weak spring 58 is used. Thus, when the tool 12 is advanced into an unfinished hole 80, the support columns 74 are strong enough to compress the spring 58, thereby preventing the tool 12 from being broken. Furthermore, the strength of the spring 58 may be readily varied with the positioning of the collar 88. As the collar 88 is moved toward the ridges 76 an increased force is required to push the support columns 74 together to allow the ridges 76 to be pushed into the hole 80. Thus, as the collar 88 is moved toward the ridges 76 a stronger spring 58 may be used.

Finally, if it is desired to obtain a longer dwell of the cutting edges 86 on the edge 94 than is permitted by the feed-in rate of the drive machine, the strength of the spring 58 may be varied such that as the tool 12 is advanced into the hole 80 the spring 58 is compressed, allowing the cutting edges 86 to remain in contact with the edge 94. The spring 58 is compressed until it develops enough force to push the support columns 74 together and allow the ridges 76 to pass into the hole 80. Thus, the tool holder 10 may not only be used to prevent breakage of the deburring tool 12 but can also be used to provide for a longer deburring dwell on the leading edge of a hole.

Although the deburring tool 12 is illustrated with two substantially parallel columns 74 and a cutting ridge 76 on each column with radially extending cutting edges 86, it is to be understood that the tool may be replaced by a cutting tool having two arms and a cutting ridge on only one of the arms, as is generally illustrated in my U.S. Pat. No. 3,276,294. Alternatively, the radially extending cutting edges 86 may be replaced with a cutting edge along the top of the cutting ridge 76 extending generally parallel to the axis of elongation of the tool for deburring inside a hole. Although the tool 12 is illustrated with an adjustment collar 88, it is to be understood that a different mechanism may be used to adjust the tension of the tool columns 74, such as a transversely extending pin within the slot 75, as is illustrated in my U.S. Pat. No. 3,411,386.

Although I have described but one preferred embodiment of my invention, it is to be understood that various changes and revisions may be made therein without departing from the spirit of the invention or the scope of the appended claims.

I claim:

1. The combination of a compression tool holder and a deburring tool comprising:

a cylindrical housing having a bore formed therein, a tool holding rod connected to a deburring tool means and having a portion extending from within said bore to a point axially spaced from said housing, said tool holding rod having an exterior surface and a straight, axially extending elongated slot formed in said exterior surface, means carried by said housing and limiting outward axial movement of said deburring tool means, a pin carried by said housing and extending into said slot to preclude relative rotation between said housing and said deburring tool means but said pin and slot permit said deburring tool means to move axially with respect to said housing, and a spring carried in said bore and urging said deburring tool means axially outwardly to the limit permitted by said limiting means.

2. The combination as defined in claim 1, and including a cylindrical collet slidably mounted around said tool holding rod within said bore adjacent the opening of said bore, said collet being secured to said housing for forming a bearing surface with said tool holding rod.

3. The combination as defined in claim 1 and in which said deburring tool means comprises a first shank portion extending from said tool holding rod, a second shank portion having cutting means at one end thereof and means for axially coupling said tool holding rod to the free end of said first shank portion.

4. The combination as defined in claim 3 and in which said second shank portion comprises a pair of spaced apart arms and including means carried by said shank portion for varying the effective length of said arms.

5. The combination as defined in claim 3, wherein said last mentioned means includes a collar adjustably longitudinally slidably mounted around said arms, and means carried by said collar and extending between said arms for providing a fulcrum between said arms which varies the effective length of said arms.

6. The combination as defined in claim 1 and in which said limiting means comprises a cylindrical collet extending into said bore and means for securing said collet to said housing, said tool holding rod being positioned within said bore and engaging with the end of said collet to thereby limit outward movement of said deburring tool means.

* * * * *

UNITED STATES PATENT OFFICE
CERTIFICATE OF CORRECTION

Patent No. 3,658,435     Dated April 25, 1972

Inventor(s) Louis A. Kubicek

It is certified that error appears in the above-identified patent and that said Letters Patent are hereby corrected as shown below:

> Column 1, line 63, after "tool" delete "form"
> and insert --from--

Signed and sealed this 19th day of September 1972.

(SEAL)
Attest:

EDWARD M. FLETCHER, JR.
Attesting Officer

ROBERT GOTTSCHALK
Commissioner of Patents